(12) United States Patent
Tavallaei et al.

(10) Patent No.: US 11,989,416 B2
(45) Date of Patent: May 21, 2024

(54) COMPUTING DEVICE WITH INDEPENDENTLY COHERENT NODES

(71) Applicant: Microsoft Technology Licensing, LLC, Redmond, WA (US)

(72) Inventors: Siamak Tavallaei, Spring, TX (US); Ishwar Agarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/049,224

(22) Filed: Oct. 24, 2022

(65) Prior Publication Data
US 2023/0074943 A1 Mar. 9, 2023

Related U.S. Application Data

(63) Continuation of application No. 17/016,156, filed on Sep. 9, 2020, now Pat. No. 11,481,116.

(51) Int. Cl.
*G06F 13/16* (2006.01)
*G06F 3/06* (2006.01)

(52) U.S. Cl.
CPC ............ *G06F 3/061* (2013.01); *G06F 3/0655* (2013.01); *G06F 3/0673* (2013.01); *G06F 13/1668* (2013.01)

(58) Field of Classification Search
CPC ...... G06F 3/061; G06F 3/0655; G06F 3/0673; G06F 13/1668
USPC ........................................................ 711/154
See application file for complete search history.

(56) References Cited

U.S. PATENT DOCUMENTS

| | | | |
|---|---|---|---|
| 10,019,252 B1* | 7/2018 | Cui | G06F 9/4401 |
| 10,572,271 B1* | 2/2020 | Tsirkin | G06F 9/45558 |
| 11,397,587 B2* | 7/2022 | Quinn | G06F 9/45558 |
| 2007/0150699 A1* | 6/2007 | Schoinas | H04L 45/04 712/13 |
| 2009/0276772 A1* | 11/2009 | Garrett | G06F 9/455 718/1 |
| 2012/0227040 A1* | 9/2012 | Gounares | G06F 9/5016 718/1 |
| 2013/0148669 A1* | 6/2013 | Noguchi | G06F 9/45558 370/401 |
| 2014/0330948 A1* | 11/2014 | Dunn | H04L 41/0813 709/221 |
| 2016/0154664 A1* | 6/2016 | Iwamatsu | G06F 9/45558 718/1 |

(Continued)

*Primary Examiner* — Christopher B Shin
(74) *Attorney, Agent, or Firm* — Alleman Hall & Tuttle LLP

(57) ABSTRACT

A computing device includes a system-on-a-chip. The computing device comprises a network interface controller (NIC) that hosts a plurality of virtual functions and physical functions. Two or more compute nodes are coupled to the NIC. Each compute node is configured to operate a plurality of Virtual Machines (VMs). Each VM is configured to operate in conjunction with a virtual function via a virtual function driver. A dedicated VM operates in conjunction with a virtual NIC using a physical function hosted by the NIC via a physical function driver hosted by the compute node. The computing device further comprises a fabric manager configured to own a physical function of the NIC, to bind virtual functions hosted by the NIC to individual compute nodes, and to pool I/O devices across the two or more compute nodes.

17 Claims, 10 Drawing Sheets

(56) References Cited

U.S. PATENT DOCUMENTS

2019/0173846 A1\* 6/2019 Patterson ............ H04L 63/1425
2020/0053147 A1\* 2/2020 Rivera ................ H04L 67/1031

\* cited by examiner

COMPUTING DEVICE WITH INDEPENDENTLY COHERENT NODES

CROSS REFERENCE TO RELATED APPLICATIONS

This application is a continuation of U.S. patent application Ser. No. 17/016,156, filed Sep. 9, 2020, the entirety of which is hereby incorporated herein by reference for all purposes.

BACKGROUND

Data centers typically include large numbers of discrete compute nodes, such as server computers or other suitable computing devices. Such devices may work independently and/or cooperatively to fulfill various computational workloads. Sets of compute nodes may be brought together into a single package in order to share resources and reduce inter-node distances.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device includes a system-on-a-chip. The computing device comprises a network interface controller (NIC) that hosts a plurality of virtual functions and physical functions. Two or more compute nodes are coupled to the NIC. Each compute node is configured to operate a plurality of Virtual Machines (VMs). Each VM is configured to operate in conjunction with a virtual function via a virtual function driver. A dedicated VM operates in conjunction with a virtual NIC using a physical function hosted by the NIC via a physical function driver hosted by the compute node. The computing device further comprises a fabric manager configured to own a physical function of the NIC, to bind virtual functions hosted by the NIC to individual compute nodes, and to pool I/O devices across the two or more compute nodes.

DETAILED DESCRIPTION

As discussed above, data centers typically include large numbers of discrete compute nodes, such as server computers or other suitable computing devices. Such compute nodes may be referred to as "host computing devices," or "hosts," as they may in some cases be used to host a plurality of virtual machines. It will be understood, however, that a compute node may be used for any suitable computing purpose, and need not be used for hosting virtual machines specifically. Furthermore, in some examples, a compute node may be implemented as a virtual machine.

Depending on the specific implementation, each individual compute node may have any suitable collection of computer hardware. Regardless, each individual compute node will typically include some local collection of hardware resources, including data storage, memory, processing resources, etc. However, computational workloads (e.g., associated with data center customers) are often not uniformly distributed between each of the compute nodes in the data center. Rather, in a common scenario, a subset of compute nodes in the data center may be tasked with resource-intensive workloads, while other compute nodes sit idle or handle relatively less resource-intensive tasks. Thus, the total resource utilization of the data center may be relatively low, and yet completion of some workloads may be resource-constrained due to how such workloads are localized to individual nodes. This represents an inefficient use of the available computer resources, and is sometimes known as "resource stranding," as computer resources that could potentially be applied to computing workloads are instead stranded in idle or underutilized nodes.

This problem can be mitigated when hardware resources are pulled out of individual compute nodes and are instead disaggregated as separate resource pools that can be flexibly accessed by connected compute nodes. For example, the present disclosure contemplates scenarios where resources such as physical memory, I/O interfaces, cache, and virtualization resources are pooled for use across all compute nodes in a system. For example, volatile memory hardware (e.g., random-access memory (RAM)), may be collected as part of a disaggregated memory pool, from which it may be utilized by any of a plurality of the compute nodes—e.g., in a data center. This serves to alleviate resource stranding, as compute nodes are free to request memory when needed, and release such memory when no longer needed.

Figure 1:
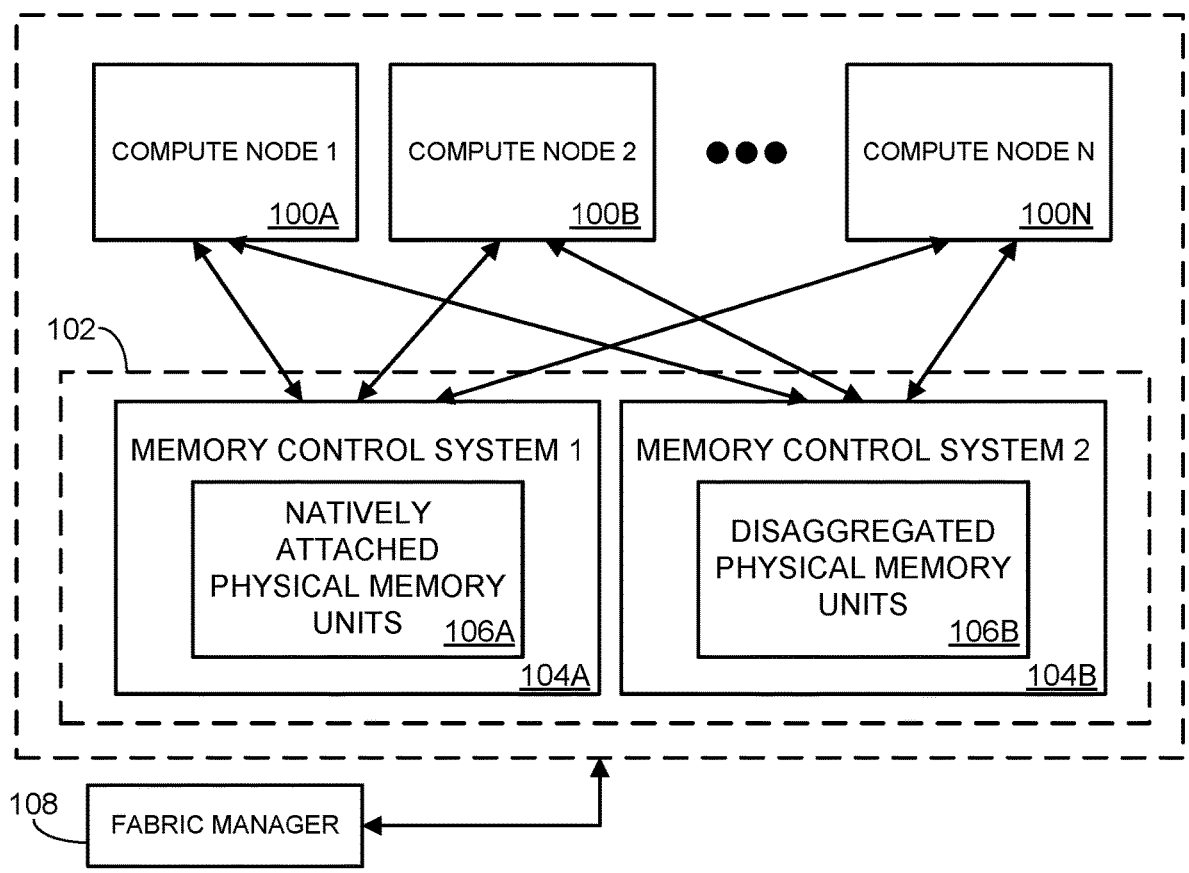
FIG. 1 schematically depicts a plurality of compute nodes communicatively coupled with a disaggregated memory pool.

This is schematically illustrated with respect to FIG. 1. As shown, a plurality of compute nodes 100A-100N (where N is any suitable positive integer) are communicatively coupled with a memory pool 102. In various examples, dozens, hundreds, thousands, or more individual compute nodes may share access to one or more disaggregated resource pools, including memory pool 102. As used herein, disaggregated memory may refer both to memory elements that are physically disaggregated and to memory elements that are physically contiguous, but are partitioned by a memory controller.

The disaggregated memory pool is comprised of at least two memory control systems 104A and 104B, which respectively govern and maintain sets of physical memory units 106A and 106B. In this example, physical memory units 106A are considered natively-attached physical memory units while physical memory units 106B are considered to be disaggregated memory units. Memory control systems 104A and 104B may cooperate to provide a single disaggregated memory pool. In other examples, however, a disaggregated memory pool may only include one memory control system, or memory control systems 104A and 104B may operate independently from each other. The memory control systems may, as one example, be serial bus interconnect programmable pattern based memory controllers (PPMCs) (e.g., compute express link (CXL)-compliant pooled memory controllers (CPMCs)). The physical memory units may, for example, be any suitable type of volatile RAM—e.g., Double Data Rate Synchronous Dynamic RAM (DDR SDRAM). The memory control systems may facilitate use of the physical memory units by any or all of the various compute nodes 100A-100N. It will be understood that a memory pool may include any suitable number of physical memory units, corresponding to any suitable total memory capacity, and may be governed by any number of different memory control systems.

FIG. 1 also schematically depicts a fabric manager 108. The fabric manager may be configured to monitor and govern the entire computing environment, including the plurality of compute nodes and memory pool 102. The fabric manager may, for example, set and apply policies that facilitate efficient and secure use of the memory pool by each of the plurality of compute nodes. Fabric manager 108 may, in some examples, coordinate operations of memory control systems 104A and 104B.

Traditionally, servers and compute nodes may each be configured to be substantially self-sufficient, including processing resources, data storage, volatile/non-volatile memory, network interface componentry, a power supply, a cooling solution, etc. However, it may be advantageous to pool resources across servers, for example by consolidating internal power supplies, cooling systems, and/or network interfaces into a central rack. This may function to reduce hardware redundancy, to provide more resources (e.g., memory) to needy nodes, and to allow for unified governance and balancing of compute node priorities with a centralized system.

Moving such a server cluster to on-silicon, system-on-a-chip(s) packages may involve balancing a number of seemingly disparate trends. On one hand, there is a trend towards on-silicon integration and building larger, monolithic systems. Emerging cooling technologies allow the operation of sizable racks of servers. Large, dense systems present opportunities for amortizing fixed costs such as platforms, racks, and cabling. However, the cost of maintaining coherence across a large core-count system increases non-linearly. On the other hand, there is a desire for right-sizing modular systems to increase utilization. Most virtual machines utilize eight or fewer virtual CPUs. At any given time, up to 40% of the memory in the disaggregated memory pool is stranded, unbilled and/or unutilized. Pooling of accelerators, network interface controllers (NICs), and storage presents a significant cost savings opportunity.

In this disclosure, systems are presented for providing balanced, pooled memory (both natively-attached and disaggregated) and IO interfaces within a firm-partitioned, multi-node, chiplet-based SoC. A multi-server-node system-on-chip implementation on one package may comprise several chiplets or dice, each including several CPU Cores and an associated boot port to independently run an OS and/or hypervisor. The compute nodes may share several external DDR channels and several internal high bandwidth memory (HBM) Channels accessible via a central IO die that also includes a plurality of serial bus interconnect links. Each compute node and internal cache is independently coherent, but is not necessarily coherent with other compute nodes. This allows locally connected memory to be partitioned and disaggregated, even if not physically disaggregated from the chip, and treated differently for each compute node. Such an implementation reduces manufacturing and maintenance costs when compared to discrete implementations using traditional single-node and/or single-OS approaches.

Figure 2:
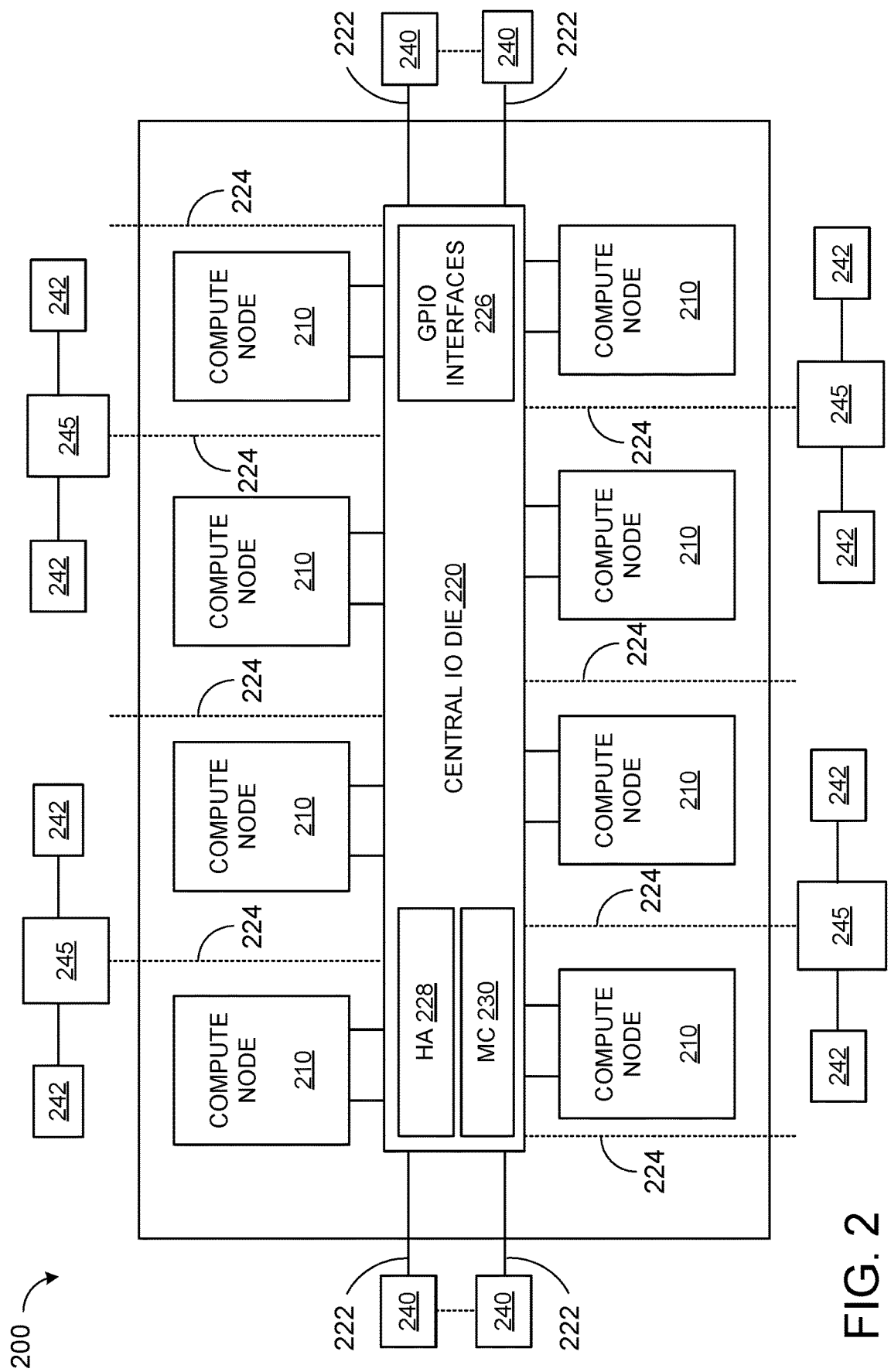
FIG. 2 schematically shows an example multi-node system-on-a-chip with a central IO die.

FIG. 2 schematically shows an example computing device 200. Computing device 200 may including one or more system(s)-on-a-chip (SoCs). However, other system configurations, such as multi-chiplet devices, and individual servers that are centrally hardwired may also be included in computing device 200. Computing device 200 may be considered a large, dense, disaggregated modular system that features dynamic pooling of all available IO, memory capacity, and bandwidth resources across a plurality of compute nodes 210.

Computing device 200 may include two or more compute nodes 210. As shown, computing device 200 includes eight compute nodes 210. Each compute node may include two or more processor cores, and each compute node may be an independently coherent domain that is not coherent with other compute nodes 210. Additional features of an example compute node 210 are discussed herein and with regard to FIG. 3.

Each compute node 210 may be configured to run an independent hypervisor usable to generate and operate one or more virtual machines (VMs). Using compute nodes that function as logical partition coherency domains enables modularity that allows for computing device 200 to run multiple hypervisors concurrently. This improves fault isolation by preventing cross-node spillover, thus reducing blast radius.

By separating compute nodes 210 in this way, computing device 200 may be provided with enough degrees of freedom to support two modes of operation at a high level. In some embodiments, the compute nodes 210 may indeed be operable in a first mode of operation where compute nodes 210 operate as a single coherent domain, similarly to current CPUs.

However, independent coherence also enables separating each compute node 210 into its own operating domain with its own operating system that can be booted and shut down independently, and otherwise acts like an independent system from the perspective of any related software stacks. This allows for a second mode of operation, where each compute node 210 operates independently.

Each of compute nodes 210 may thus be independently bootable, and may be configurable to independently run one of two or more operating systems (e.g. kbm, hyperV). In other words, any individual compute node 210 may run an operating system that is not the same operating system run by each of the other compute nodes 210. This enables computing device 200 to run multiple operating systems simultaneously, thus allowing for assignments to be directed to the compute node 210 running the most relevant and/or suitable operating system for that assignment. The cores and caches within a single compute node 210 may be collectively coherent, even if they are not coherent with the cores and caches incudes in other compute nodes 210. However, in some implementations, two or more compute nodes 210 may form a coherent group and/or two or more compute nodes 210 may concurrently run a same operating system.

Typically, each compute node 210 must be provisioned with its own set of resources. The topology, or method of construction described for computing device 200, allows for the pooling of some or all of the platform resources such that they're available to all of the compute nodes 210 in computing device 200.

Such poolable platform resources include memory (both bandwidth and capacity), the I/Os (e.g., PCIe devices, accelerators, links, storage), as well as legacy platform components, such as a base band management controller, a real time clock, and a trusted platform module (TPM). Pooling these resources allows computing device 200 to forgo duplicating each component for each compute node 210, allowing for efficient utilization of the pooled resources while maintaining constraints on power and cost.

As an example, computing device 200 may further include a central IO die 220 that is communicatively coupled to each of the two or more compute nodes 210, and that enables the pooling of platform resources among compute nodes 210. Essentially, computing device 200 may be configured using multi-chip module architecture with separation of compute and IO chiplets.

Central IO die 220 may contain all package IO interfaces for computing device 200, including DDR interfaces 222 (solid lines), serial bus interconnects 224 (dashed lines), general purpose IO (GPIO) interfaces 226, etc. Each of these IO interfaces may include shared, multi-domain links for all firm partitions (e.g., compute nodes 210) to operate independently while maintaining maximum available bandwidth to any CPU Core (e.g., Boot Ports, serial bus interconnects). Central IO die 220 may further include home agents (HA) 228 and memory controller agents (MC) 230. In this way, each compute node 210 may make use of the provided functions and receive supported access to connected external devices. Additional components and structure of an example central IO die are described herein and with regard to FIG. 7.

Central IO die 200 thus provides sufficient ports for serial bus interconnects to provision ample connectivity for a variety of external devices and to allow for increased disaggregated memory bandwidth. Central IO die 200 may virtually integrate a multi-node aware serial bus switch and the fabric manager may be further integrated onto central IO die 200 for pooling of IO devices among compute nodes 210. Central IO die 200 may be configured to be one-way coherent with each processor core, while cache and memory serial busses may be configured to be two-way coherent with each core.

In this example, several DDR Channels are connected to central IO die 220 to be shared amongst all compute nodes 210 and their respective cores, making all memory bandwidth and capacity available to each core of each compute node 210 at different times.

One or more natively-attached volatile memory units 240 are attached to central IO die 220 via a memory controller agent 230 and a DDR interface. Central IO die 220 includes one or more home agents 228 for each compute node 210, the home agents 228 configured to map memory access requests received from a compute node 210 to one or more addresses within the volatile memory units 240. Each memory controller agent 230 may comprise one or more high bandwidth memory channels configured to be shared among the two or more compute nodes. Each memory controller may further operate one or more disaggregated caches, functioning as an optional near-memory cache.

Additionally, one or more disaggregated memory units 242 are attached to central IO die 220 via a serial bus interconnect 224. Home agents 228 may be further configured to map memory access requests received from a compute node 210 to one or more addresses within the disaggregated memory units 242. Disaggregated memory units 242 may be coupled to central IO die 220 via a PPMC controller 245 or other suitable memory controller that automates access to one or more disaggregated memory units 242. Each compute node 210 thus has access to each of the natively-attached volatile memory units 240 and each of the disaggregated memory units 242.

As shown, compute system 200 includes 12 channels of DDR5 RAM, including 8 channels of disaggregated memory units 242 and 4 channels of natively-attached volatile memory units 240. As one non-limiting example, using a DIMM size of 64 GB, compute system 200 would include 12 total units of natively-attached volatile memory for a total of 768 GB, and 64 total units of disaggregated memory for a total of 1024 GB, for a total pooled capacity of 1792 GB of RAM.

The pooling and distribution of this memory may occur at central IO die 220. Accesses to natively-attached volatile memory units 240 may be more rapid than accesses to disaggregated memory units 242 that are routed through a PPMC controller 245, and memory requests may be prioritized as such. Further, disaggregated memory units 242 may be physically disaggregated and located at different physical locations relative to central IO die 220. While natively attached volatile memory units 240 are directly connected to central IO die 220, the memory units themselves may still be considered to be disaggregated as different portions of each memory unit may be specifically assigned to any one of multiple compute nodes. In some examples, one or more natively-attached volatile memory units 240 may be pooled for use by several compute nodes 210. Additionally or alternatively, a region of a memory unit may be dedicated for one or more compute nodes 210, and not available to other compute nodes 210. In some examples, additional natively-attached volatile memory units may be provided that are directly linked, and dedicated specifically to one compute node 210.

Both natively-attached volatile memory units 240 and disaggregated memory units 242 may be allocated or assigned to one or more compute nodes 210. Assignments to the natively-attached volatile memory units and the disaggregated memory units may be based at least on one or more of compute node-specific requirements, application-specific requirements, software-based policies, received compute node requests for additional memory and availability of one or more of natively-attached volatile memory units and disaggregated memory units. Memory reassignments may be performed periodically and/or in response to operating conditions, be they previous conditions, current conditions, or anticipated future conditions.

Further, it is contemplated that various strategies may be employed when an amount of unassigned portions/slices of natively-attached volatile memory units 240 and/or disaggregated memory units 242 runs low. In such a case, compute system 200 has less freedom to satisfy requests from compute nodes 210 to receive larger memory assignments, for example when such compute nodes 210 commence or prepare for more intensive computing tasks.

Mitigation strategies may include identifying a "memory pressure" situation (i.e., available pool of natively-attached volatile memory units 240 and/or disaggregated memory units 242 is low) and then activating mechanisms for freeing up memory units, which often includes revoking or unassigning memory that is currently reserved to a compute node 210. Revoking memory may be conducted with reference to priority assessment—e.g., management may be conducted to override least-frequently or least-recently-used strategies, or other assessments targeted to minimizing the harm or impact of memory revocation.

In some cases, revocation can include relocating displaced data, e.g., to another disaggregated memory unit 242 portion managed by a different PPMC controller 245, or to a larger, higher latency bulk memory location. As such, portions of one or more of the natively-attached volatile memory units may be unassigned from a first compute node and re-assigned to a second compute node based on one or more of node-specific requirements within the computing device, received requests from the second compute node for more memory, and an availability of one or more of natively-attached volatile memory units and disaggregated memory units. Relief, in some scenarios, may come in the form of a different type of memory. For example, a compute node 210 that has maxed out its assignment of natively-attached volatile memory units 240 and requests additional memory may receive an allocation of disaggregated memory units 242.

Mitigation may additionally or alternatively include sending warnings to compute nodes (e.g., originating from native or pool memory controllers, or from fabric managers or other infrastructure) to prompt compute nodes to assist in relieving memory pressure. Such assistance from the compute nodes may include the nodes voluntarily relinquishing native and/or disaggregated pool memory that they are holding, or delaying or avoiding requests for more memory that they might have otherwise made in the absence of the pressure warning.

Each disaggregated memory unit 242 may include a plurality of slices of memory, (e.g., 1 GB slices) that can be assigned, un-assigned, and reassigned to the different compute nodes 210. PPMC controller 245 may keep track of each assignment, manages each slice, and routes read/write access requests to the appropriate slice. Operation of PPMC controller 245 may be regulated at least in part by a fabric manager residing on central IO die 220.

In some examples, one or more slices of natively-attached volatile memory units 240 may be assigned to a specific compute node 210 based on node-specific requirements, as prefaced above. The assigned slices of natively-attached volatile memory units 240 may require permission from the associated memory controller 230 to be used. Memory controller 230 may then provide a portion of the allocation to the compute node 210. In some examples, portions of one or more of the natively-attached volatile memory units 240 may be unassigned from the first compute node and re-assigned to a second compute node based on activity of one or compute nodes 210 within computing device 200. Additionally or alternatively, a portion of the natively-attached volatile memory units assigned to the first compute node may be increased based on a change in node-specific requirements. Node-specific requirements may include, but are not limited to, node provisioning, identity, type, number, bandwidth of programs and/or applications being run, operating system(s) being run, types and number of virtual machines being executed, whether the node is part of a functional group of nodes that is designated to perform specific tasks in tandem, and priority of compute node operations in the context of the entirety of compute nodes.

As described above, natively-attached volatile memory units 240 may be unassigned and/or reassigned periodically, or in response to operating conditions. Memory controller 230 may receive requests for additional allocations of natively-attached volatile memory units 240 and selectively grant expanded memory assignments. For example, if two compute nodes 210 share an allotment of natively-attached volatile memory units 240, the granting of a request from a first compute node for an additional allocation of natively-attached volatile memory units 240 may depend on requirements specific to a second compute node. For example, one node may be operating with a relatively higher guaranteed quality-of-service agreement, and/or may be executing higher priority applications or tasks.

Once assigned, each compute node 210 may determine how to manage their allotment of natively-attached volatile memory units 240 and disaggregated memory units 242. A region of memory for a compute node 210 may include slices of both natively-attached volatile memory units 240 and disaggregated memory units 242, although the relative latency may be different. A compute node 210 may prioritize use of natively-attached volatile memory units 240 in order to reduce latency for particular tasks, while assigning disaggregated memory units 242 for less urgent tasks. In some examples, a compute node 210 may interleave memory assignments to generate an average latency across all tasks.

In some examples, the amount of disaggregated memory collectively allocated to the plurality of compute nodes 210 may exceed the amount of memory actually provisioned in the disaggregated memory pool. This is sometimes referred to as "thin provisioning." In general, in data center environments without thin provisioning, it can be observed that individual compute nodes 210 (and/or virtual machines implemented on the compute nodes 210) are often provisioned with more resources (e.g., storage space, memory) than the compute nodes 210 end up actually using, statistically over time. For instance, the amount of memory installed for a particular compute node 210 may be significantly higher than the amount of memory actually utilized by that compute node 210 in most situations. When compounded over a plurality of compute nodes 210, the amount of unused memory (or other resources) can represent a significant fraction of the total memory (or other resources) in the data center.

In one example scenario without thin provisioning, a memory pool including 1792 GB of total memory may be distributed evenly between eight compute nodes 210. As such, each compute node may be assigned 96 GB of natively-attached volatile memory units 240 as well as 128 GB from disaggregated memory units 242, thus each node is allocated a total of 224 GB of provisioned memory from the total pooled memory.

However, it is generally unlikely that each compute node 210 will fully utilize its memory allocation. Rather, in a more common scenario, each compute node 210 may only use a maximum of 50% of its allocated memory during normal usage, and some compute nodes 210 may use significantly less than 50%. As such, even though the 1792 GB disaggregated memory pool will be fully assigned to the plurality of compute nodes 210, only a relatively small fraction of the pooled memory may be in use at any given time, and this represents an inefficient use of the available resources.

Given this, the amount of memory actually available—i.e., "provisioned"—in the total memory pool could be reduced without significantly affecting performance of the plurality of compute nodes 210. While each particular compute node 210 may be allocated 96 GB of natively-attached volatile memory as well as 128 GB of disaggregated memory, it is statistically likely that many compute nodes 210 will not use all, or even a significant portion, of either memory allotment at any given time. Thus, any unused natively-attached volatile memory 240 assigned to one compute node 210 may be reassigned to one or more of the other nodes 210 by a memory controller 230, and any unused disaggregated memory 242 assigned to one compute node 210 may be reassigned to one or more of the other nodes 210 by a PPMC 245. In this manner, any particular compute node 210 has the option to use up to 224 GB of total memory if needed, while still conserving memory in at least the disaggregated memory pool, due to the fact that each compute node 210 typically will not use 224 GB at any given time.

Such thin provisioning may be done to any suitable extent. It is generally beneficial for the amount of available memory to exceed the amount of memory typically used by the plurality of compute nodes 210 under typical circumstances. In other words, if the compute nodes 210 typically use around 256 GB, then it is generally desirable to have more than 256 GB of memory actually provisioned between the natively-attached memory and the disaggregated memory, such that the compute nodes 210 do not exhaust the available memory during normal use. In practice, however, any suitable amount of memory may be provisioned in the disaggregated memory pool, which may have any suitable relationship with the amount of memory allocated to the plurality of compute nodes 210.

When thin provisioning is implemented, there may be instances in which the plurality of compute nodes 210 attempts to collectively use more memory than is available in the disaggregated memory pool. As described above, this may be referred to as "pressuring" the disaggregated memory pool. Various actions may be taken to address this scenario. For example, memory assignments, be they natively-attached volatile memory units or disaggregate memory units, may be stripped away from one or more compute nodes 210 regarded as having a lower priority or lower need for the memory. Additionally, or alternatively, memory requests for the plurality of compute nodes 210 may be routed to a different disaggregated memory pool that may still have available memory, at the cost of higher latency. With natively-attached volatile memory units 240 assignable by a memory controller 230 and/or fabric manager, and disaggregated memory units 242 being assignable by a PPMC 245, portions of either natively-attached, volatile memory units or disaggregated memory units may be routed to compute nodes 210 based on node-specific requirements.

Requests for additional memory may have an inherent preference for a memory type, and/or may indicate a priority and/or other parameters that indicate how preferential one memory type is over another. For example, a compute node may generally prefer natively-attached volatile memory units 240 to disaggregated memory units 242 due to latency issues and/or the impact on other systems that may be coupled to disaggregated memory units 242 via PPMCs 245. However, this may be balanced with memory pressure on natively-attached volatile memory units 240, constraints on the use of the available memory (e.g., lengthier operations that merely need to have a result retrieved at a later time point may not be prioritized for natively-attached volatile memory units 240). However, when memory pressure needs to be relieved, disaggregated memory units 242 may be reassigned first, as the availability of the disaggregated memory pool is more important to the overall compute system 200, as this pool of memory may be used to increase the overall fluidity and stability of compute system 200.

A compute node 210 may request natively attached volatile memory units, disaggregated memory units 242, and/or generic memory, depending on node-specific requirements. For example, if a compute node 210 experiences an increase in latency, it may request more natively attached memory. If memory controller 230 is unable to fulfill such a request, the request may be forwarded to one or more PPMCs 245.

Notably, the memory addressing techniques described herein may be implemented with or without thin provisioning. In other words, memory address mapping as discussed herein may occur in "thin" provisioned or "thick" provisioned contexts. Furthermore, both thick and thin provisioning techniques may be used in the same implementation.

Additionally, or alternatively, each compute node 210 may be pre-assigned some amount of memory capacity in the disaggregated memory pool. If and when a particular compute node 210 completely fills its assignment and requests a larger assignment, the node 210 may negotiate with the memory control system (e.g., PPMC 245) to determine whether and how much additional disaggregated memory the compute node 210 should be assigned, and this may include reducing the assignment reserved for another compute node 210. In this manner, the amount of memory capacity available in the disaggregated memory pool may be carefully balanced and divided between the plurality of compute nodes 210 in keeping with each compute node's actual needs, rather than allow each individual compute node 210 to seize memory capacity they have no need for.

As such, one compute node 210 may be provisioned with a particular set of parameters and/or options that would be different from the way another compute node 210 would be provisioned. For example, certain compute nodes 210 may consistently require more memory capacity and bandwidth than others. Further, each compute node 210 may be presented with a custom partition of memory and IO devices. Thus, each compute node 210 may be provided with asymmetric access to resources and/or asymmetric mapping to resources, depending on the needs of the compute nodes 210 and the computing system 200 as a whole. For example, if a first compute node requires local storage but a second compute node does not, the allocated local storage for the second compute node could be assigned to the first compute node. By centralizing resources that would normally be statically provisioned at the central IO die, each compute node may be effectively treated as a different type of hardware and/or firmware partition.

Figure 3:
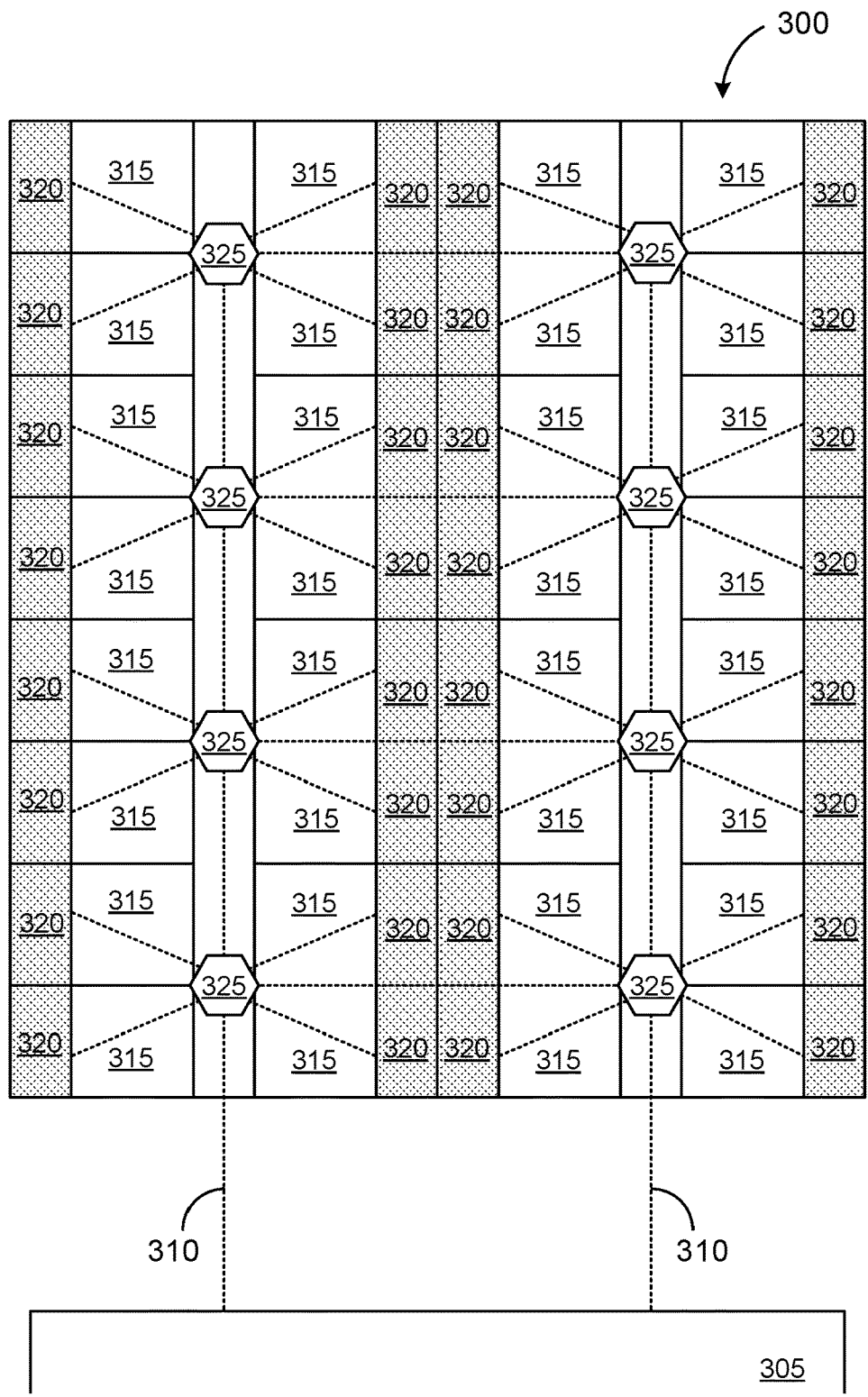
FIG. 3 schematically shows one example compute node of the system of FIG. 2.

Turning to FIG. 3, an example compute node 300 is schematically shown. Compute node 300 may be an example of compute node 210. Compute node 300 is shown connected to central IO die 305 via a pair of high-speed serial interconnect links 310.

In this example, compute node 300 includes 32 cores 315 and 32 L3 caches 320, for a set of 32 slices. However, other quantities of cores and caches are possible. For the compute system shown in FIG. 2, the 8 nodes would thus provide a total of 256 cores. However, as chip technology improves, the number of cores per compute node may increase (e.g., 64 cores/node at 5 nm, 128 cores/node at 3 nm). As shown, the 32 L3 caches 310 are interconnected in groups of 4 caches via one of 8 interconnect hubs 325 within compute node 300.

As described, cores 315 are firm-partitioned from the cores within other compute nodes. In this way, a reasonable die size may be maintained for each compute node 300, thus maximizing yield while minimizing power consumed. However, the portioning of the cores need not be limited to a single compute node, and the total set of cores may be provisioned and re-provisioned as necessary.

As the number of cores within a coherence domain increases, the complexity increases non-linearly. Thus, by maintaining a reasonably small number of cores per compute node, the system complexity remains modest. Such a computing device is not architected to support one very large VM, rather, it is built for a number of VMs, each having a limited number of cores (e.g., 32). VMs may be opportunistically distributed across nodes.

Figure 4:
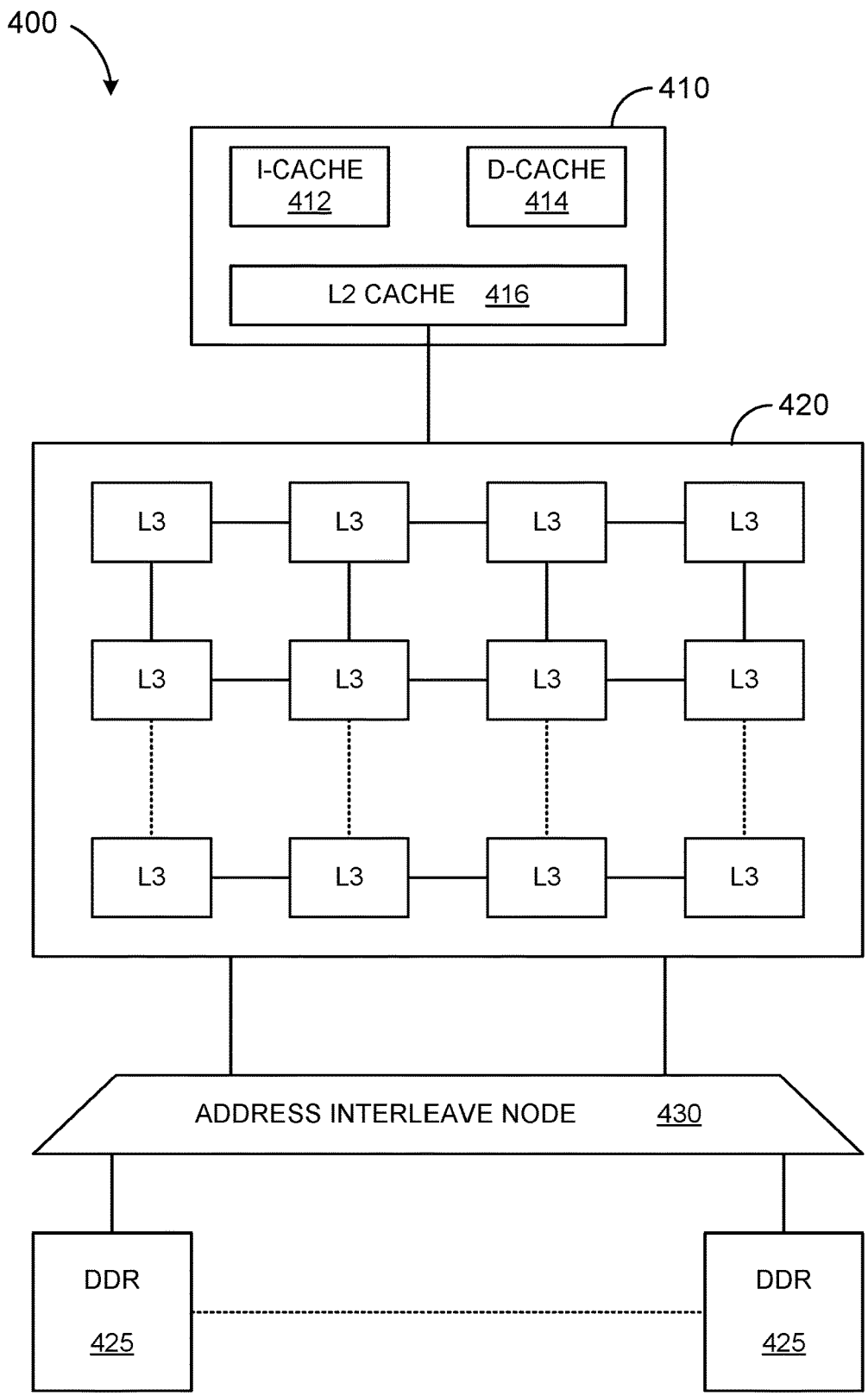
FIG. 4 schematically shows an example cache organization schema for an example compute node.

FIG. 4 schematically shows how an example cache organization schema for an example compute node 400. Compute node 400 may be an example of compute nodes 210 and 300. Compute node includes a plurality of cores 410 (e.g., 32 cores, as shown for compute node 300). Each core 410 may include private caches for instructions (I-cache 412), data (D-cache 414), and an associated core-specific L2 cache 416. Additionally, each core 410 may include one or more shared, distributed L3 caches 420. As shown in FIG. 3, for a 32 core compute node, each core may be paired with a shared L3 cache, each of which may be accessed by each core of the compute node. Cache coherency among the L3 caches of a compute node may be managed using any suitable methodology. Each compute node 400 further has access to DDR memory 425 via an address interleave decode 430 of a central IO die. As described with regard to FIG. 2, one or more disaggregated caches may be coupled to each memory controller.

Each compute node, as an individual, hardware portioned machine has its own internal understanding of an address map for memory locations within the node. However, with multiple, potentially identically configured compute nodes within a single compute system, the central IO die may distinguish between the host physical addresses for each node using a package physical address.

Figure 5:
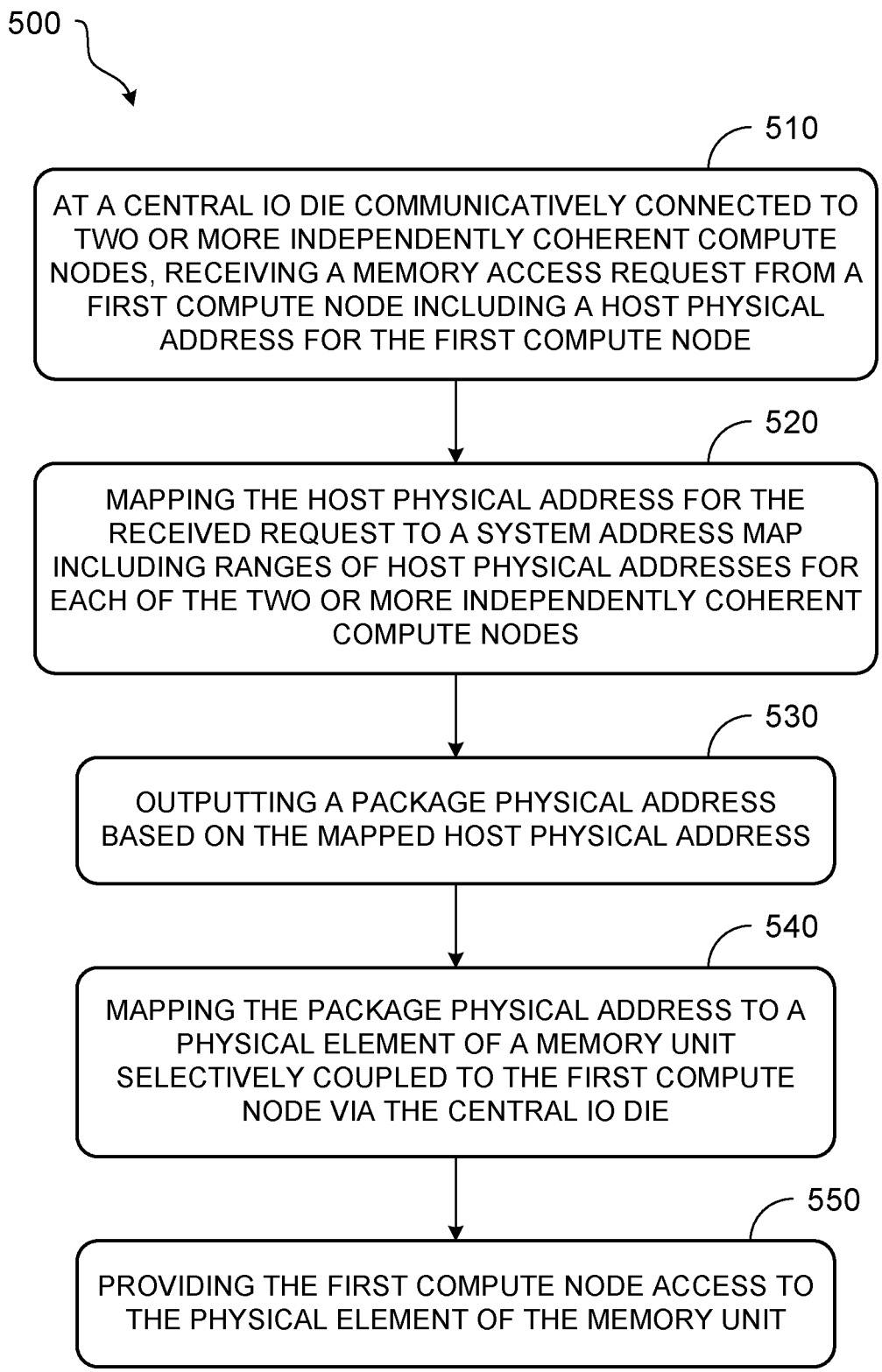
FIG. 5 is an example method for memory address mapping across multiple compute nodes.

FIG. 5 shows an example method 500 for memory address mapping across multiple compute nodes. Method 500 may be executed by a logic core of a central IO die of a multiple compute node computing system.

At 510, method 500 includes, at a central IO die, communicatively connected to two or more independently coherent compute nodes, receiving a memory access request from a first compute node including a host physical address for the first compute node. In general, a host physical address refers to a particular compute node's internal identifier for a particular memory address within the node's larger address space. Reads and writes to a particular HPA may ultimately terminate at a physical memory unit (e.g., RAM DIMM) in the disaggregated memory pool.

At 520, method 500 includes mapping the host physical address for the received request to a system address map including ranges of host physical addresses for each of the two or more independently coherent compute nodes. This may include, for example, receiving an indication of one or more ranges of HPAs from each compute node of a plurality of compute nodes communicatively coupled to the central IO die.

Figure 6:
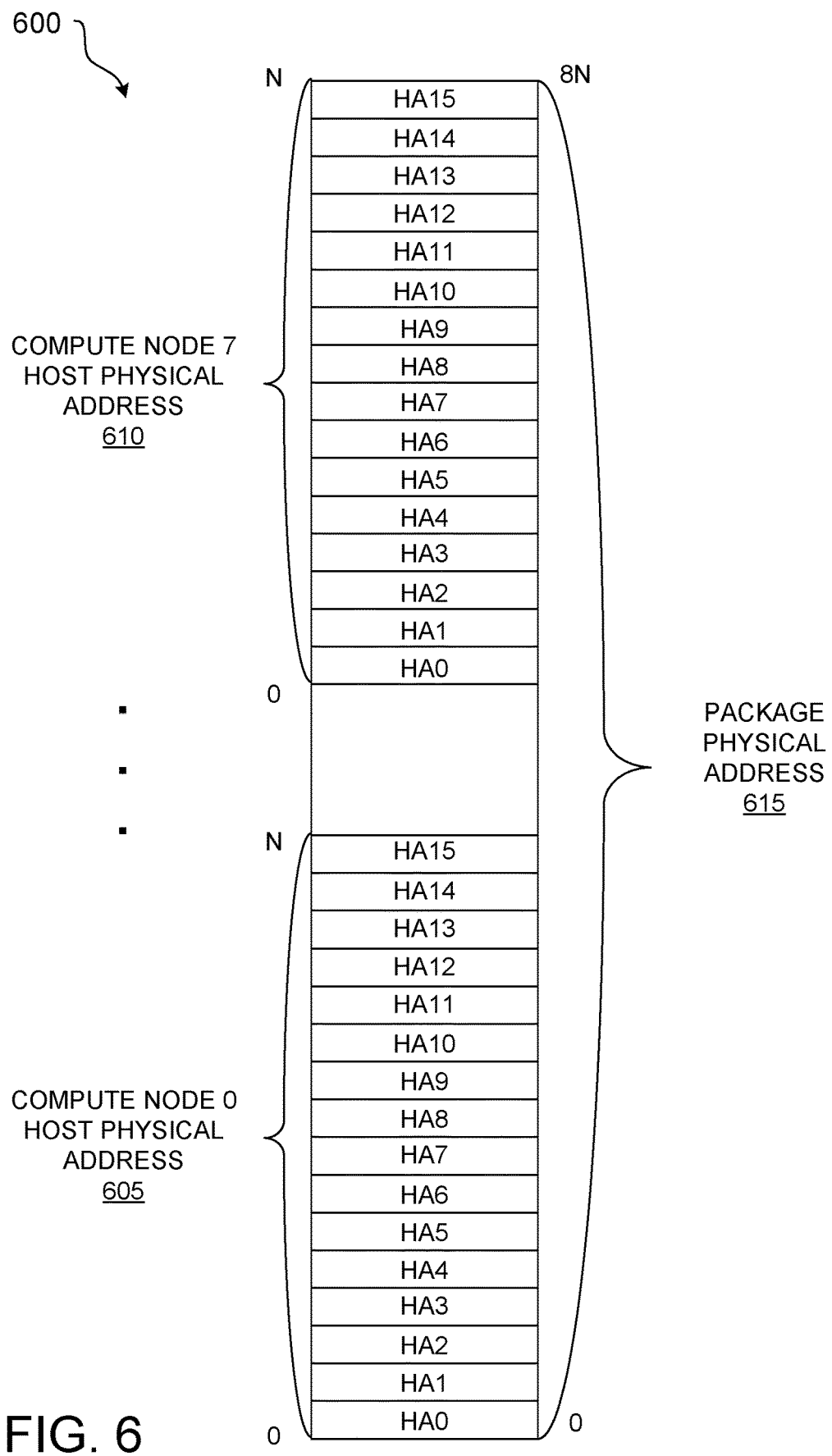
FIG. 6 schematically shows an example data structure for mapping memory addresses across multiple compute nodes.

As an example, FIG. 6 schematically depicts an example data structure 600 for mapping memory addresses across multiple compute nodes. Data structure 600 schematically depicts the relationships between the host physical addresses as seen by each node with the package physical address as seen by the central IO die. A first compute node (e.g., compute node 0) maps host physical addresses to a first range 605. Each additional node maps host physical addresses to an additional range (e.g., compute node 7 maps to range 610), such that each host physical address is mapped into the package physical address space. In this example, a system address map includes contiguously stacked address slabs of equal length for each of the two or more nodes, where each slab corresponds to the host physical address range for the respective node. In this example, each compute node includes 16 banks of host physical addresses. In some examples, the range of the host physical addresses is interleaved among available home agents and memory channels included in the IO die. In this way, each compute node may be provided with access to full memory bandwidth.

Returning to FIG. 5, at 530, method 500 includes outputting a package physical address based on the mapped host physical address. For example, FIG. 6 shows a range of package physical addresses 615 that includes each host physical address for each compute node (e.g., compute nodes 0-7). In some examples, the package physical address includes a node ID appended to the host physical address (e.g., 0-7). This may be accomplished by commandeering the upper address bits to insert the node ID when a request enters the IO die. In other words, the node ID may act as an effective area code for the host physical addresses within a compute node.

At 540, method 500 includes mapping the package physical address to a physical element of a memory unit selectively coupled to the first compute node via the central IO die. Such mapping may include mapping the package physical address to a DIMM, bank, bank group, row, and column of a particular RAM unit. In some cases, mapping of memory addresses to physical memory units may be governed by a fabric manager, to prevent any individual compute node or memory control system from compromising the environment as a whole.

At 550, method 500 includes providing the first compute node access to the physical element of the memory unit. For example, access may be provided using the package physical address, as this refers to the total addressable physical memory elements within the entirety of the computing system. In some examples, where the memory unit is positioned outside of the compute system, the associated memory controller may be interconnected to multiple packages. As such, a package identifier may be appended to the package physical address to allow the memory controller to distinguish between requests.

Figure 7:
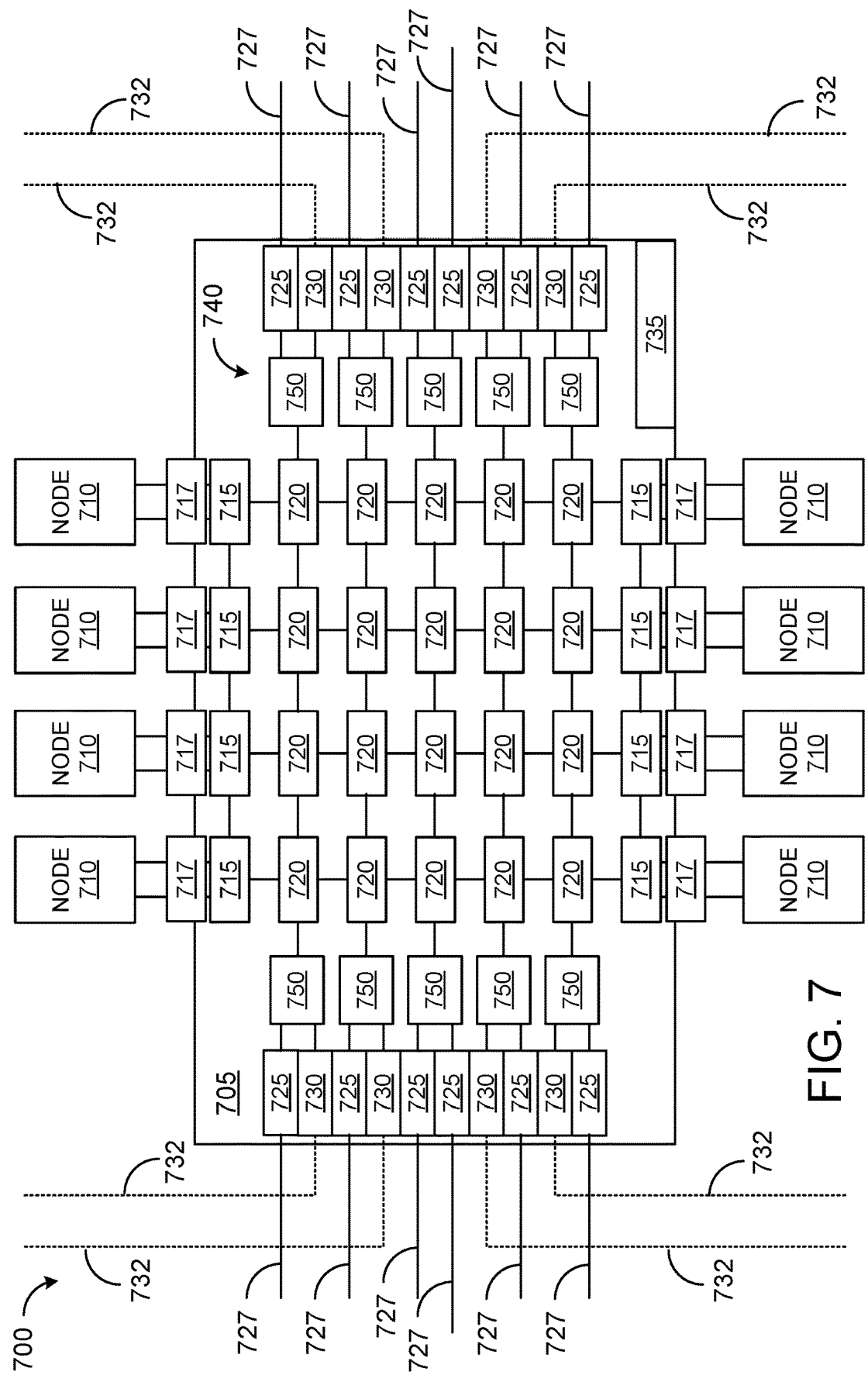
FIG. 7 schematically shows an example architecture for an IO die of the system of FIG. 2.

Along with mediating access to disaggregated memory and cache, the central IO die may be used to pool and distribute access to IO devices for each compute node, thus linking the compute nodes to all off-package interfaces. FIG. 7 shows a computing system 700 with a more detailed mapping of a central IO die 705. Computing system 700 and central IO die 705 may be examples of computing system 200 and central IO die 220.

Central IO die 705 is coupled to eight compute nodes 710 via dedicated compute die ports (CDP) 715 and at least one dedicated boot port 717 for each of the compute nodes 710, allowing each compute node 710 to be booted independently using its own operating system or hypervisor. The CDPs 715 are each linked to a home agent (HA) 720. Each home agent 720 maintains information about their respective connected compute nodes' internal addresses. As such, home agents 720 are responsible for both coherency and management of memory resources for the compute nodes 710. Multiple HAs 720 are provided to distribute their workload for bandwidth reasons. These interconnected HAs 720 distribute the received accesses from the compute nodes 710 so that the appearance of hotspots is reduced. Additional description of home agents 720 is presented herein and with regard to FIG. 8.

From each HA 720, when access to a specific memory element is requested, the HA 720 decodes which of the memory controllers the memory element maps to. In some examples, the memory element may map to one of a plurality of memory controllers 725 locally attached to DDR memory (e.g., via DDR interfaces 727, solid lines) and configured to selectively couple each compute node 710 to one or more natively-attached volatile memory units. Additionally or alternatively, the memory element may map to one of a plurality of pooled PPMCs coupled to a serial bus interconnect (SBI) 730 at a disaggregated location (e.g., via dashed lines 732) to selectively couple each compute node to one or more disaggregated memory units.

A fabric manager 735 may be configured to mediate pooling of all IO devices, including memory, among the compute nodes 710. Fabric manager 735 may mediate the binding of each processor, core, compute node, etc. to hardware elements and ports of central IO die 705. As the different compute nodes 710 may have different configurations and requirements, this binding may be unbalanced. A mesh-based, on-die interconnect 740 may be used to couple each of these elements of central IO die 705. I/O ports (IOP) 750 may mediate traffic to and from external elements such that IO direct memory access (DMA) traffic remains on the central IO die after translation from the input-output memory management unit IOMMU inside each IOP.

At each CDP 715, traffic in and out of the associated compute node 710 may be metered, allowing for the provision of memory bandwidth partitioning as described with regard to FIG. 2, as well as the prioritization of traffic to and from external IO devices. This allows for providing different levels of service and allocations of resources to the different compute nodes 710. For memory capacity partitioning, individual compute nodes 710, and even individual cores within each compute node 710 may be brought online so that memory is allocated differently among different hosts, as described with regard to FIG. 2. In conjunction with CDP 715, fabric manager 735 may use machine-learning principles to determine when and if certain compute nodes 710 need a greater memory allocation, and which compute nodes 710 may release at least part of their current allocation. Fabric manager 735 may set policies, such as ceilings and floors that automatically function to determine that is a VM is likely to be utilized, a greater allocated share of resources is provided. Additionally or alternatively, policies may set firm partitioning, such that a compute node is unable to exceed its allocation, even if other VMs are currently idle.

Figure 8:
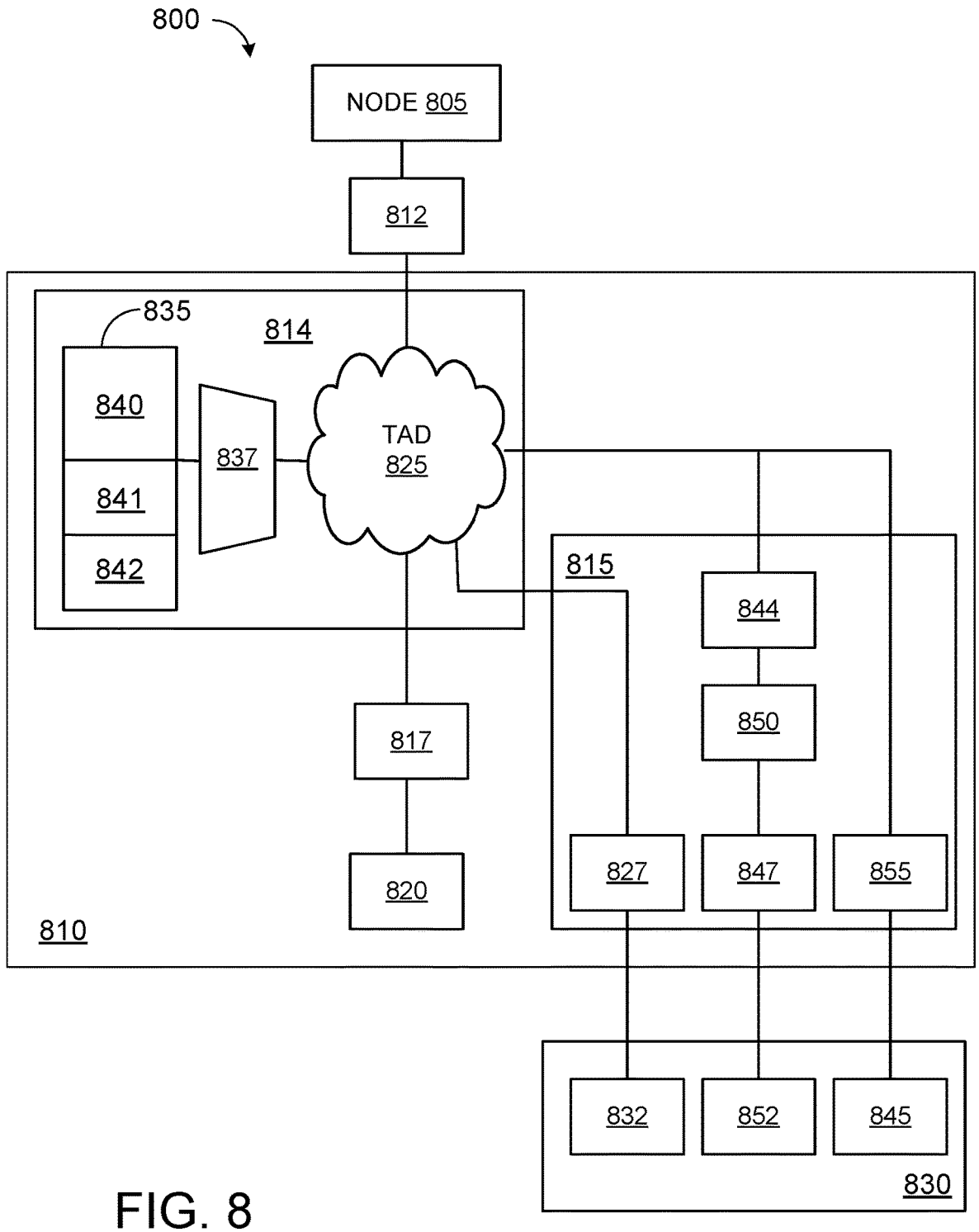
FIG. 8 schematically shows an example coherence map for a computing system.

FIG. 8 shows an example coherence map for a computing system 800. Computing system 800 may be an example of computing systems 200 and 700, and is shown in simplified form, with a single compute node 805 connected to a central IO die 810. Compute node 805 is shown coupled to a home agent 810 via a compute die port (CDP) 812. Home agent (HA) 814 is coupled to IO port 815 and memory controller 817, which is turn is coupled to DDR RAM 820. HA 810 may be considered to be the center of coherency management in central IO die 810.

When a request is received from compute node 805 via CDP 812, CDP 812 decodes the address within the request and determines which of the distributed HAs within central IO die 810 should receive the request (e.g., by mapping to a package physical address). Once directed to HA 810, the request is passed to target address decoder (TAD) 825. TAD 825 is responsible for mapping the request to a target. For example, if a memory access request is received, TAD 825 determines whether the request is for natively-attached DDR. If so, the request is sent to memory controller 817 and the specific DDR 820 it maps to. Alternatively, if the memory access request is for disaggregated memory, the request is sent to the memory port 827 within IO port 815, then to external device 830, which hosts disaggregated memory 832.

In addition, HA 810 contains a cache currency mechanism 835 which may be considered akin to a set of snoop filters. Such snoop filters allow HA 810 to ensure that the accesses are cache current and are not violating any currency rules. As such, if an updated copy of a request exists in content addressable memory (CAM) 837, the snoop filters (SF) (e.g., sectored SF 840, SBI $ SF 841, IO $ SF 842), will uncover the updated copy from compute node 805, IO Wr $ 844 and external cache 845, respectively, and present it for retrieval.

HA 810 is further responsible for handling requests from external devices, such as a PCIe device that is configured to perform reads and/or writes to memory. Such a request may emanate from logic within external device 830 and be sent to the SBI root port 847. Root port 847 may then translate the IO virtual address that is sent by external device 830, e.g., using IOMMU 850, and convert it into a known physical address. That address may then be decoded and sent to HA 810. IO logic 852 may perform this decoding using one or more hashing functions, such as the same hashing function that exists in CDP 812, such that any request for a given address ends up at the same HA, thereby maintaining currency. HA 810 may then translate the requested address for the external device. IO port 815 may further include an SBI $ port 855, allowing for parallel lookups to external cache 845 and to disaggregated memory 832.

Figure 9A:
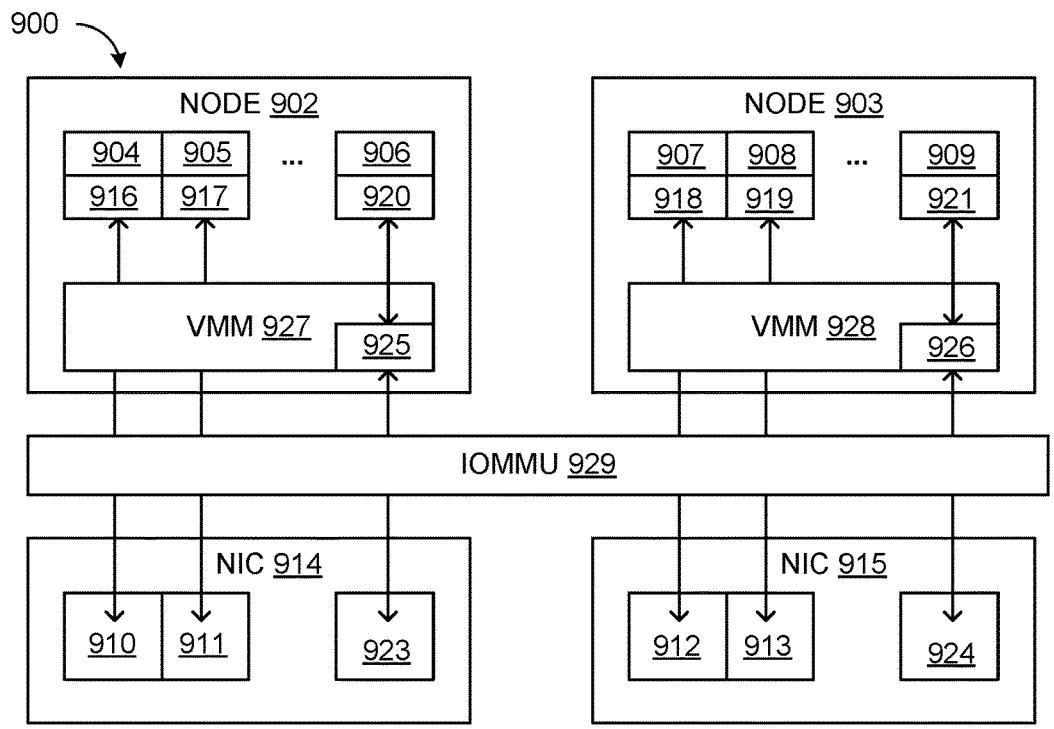
FIG. 9A schematically shows a traditional system accessing IO devices across multiple compute nodes.

FIG. 9A schematically shows a traditional system 900 for accessing IO devices across multiple compute nodes. In system 900, each compute node (e.g, nodes 902 and 903, though more may be included) operates a plurality of virtual machines (e.g., VMs 904, 905, 906, 907, 908, 909). Most of the virtual machines operate in conjunction with a virtual function (e.g., VF 910, 911, 912, 913) hosted by a network interface controller (NIC) (e.g., NICs 914 and 915), via a virtual function driver (e.g., VF drivers 916, 917, 918, 919). Each compute node includes one virtual machine (e.g., VMs 906, 909) that operates in conjunction with a virtual NIC (e.g., Virtual NICs 920 and 921) using a physical function (e.g., physical functions 923, 924) hosted by the NIC via a PF driver (e.g., PF drivers 925, 926) of a virtual machine manager (e.g., VMM 927, 928) for the respective node. Physical functions 923 and 924 may perform the function of a network adapter that supports the single root I/O virtualization (SR-IOV) interface, which may be leveraged to achieve the pairing between the node and NIC via IOMMU 926.

Each NIC represents a device that includes interfaces that are highly partitionable to software, and may include a plurality virtual functions (910, 911, 912, 913) which can be directly assigned to software entities (e.g., virtual machines 904, 905, 907, and 908) for direct management. However, in this configuration, direct management is limited to generating n virtual machines inside of one physical machines, with each of the n virtual machines deriving virtual functions from a dedicated NIC.

Figure 9B:
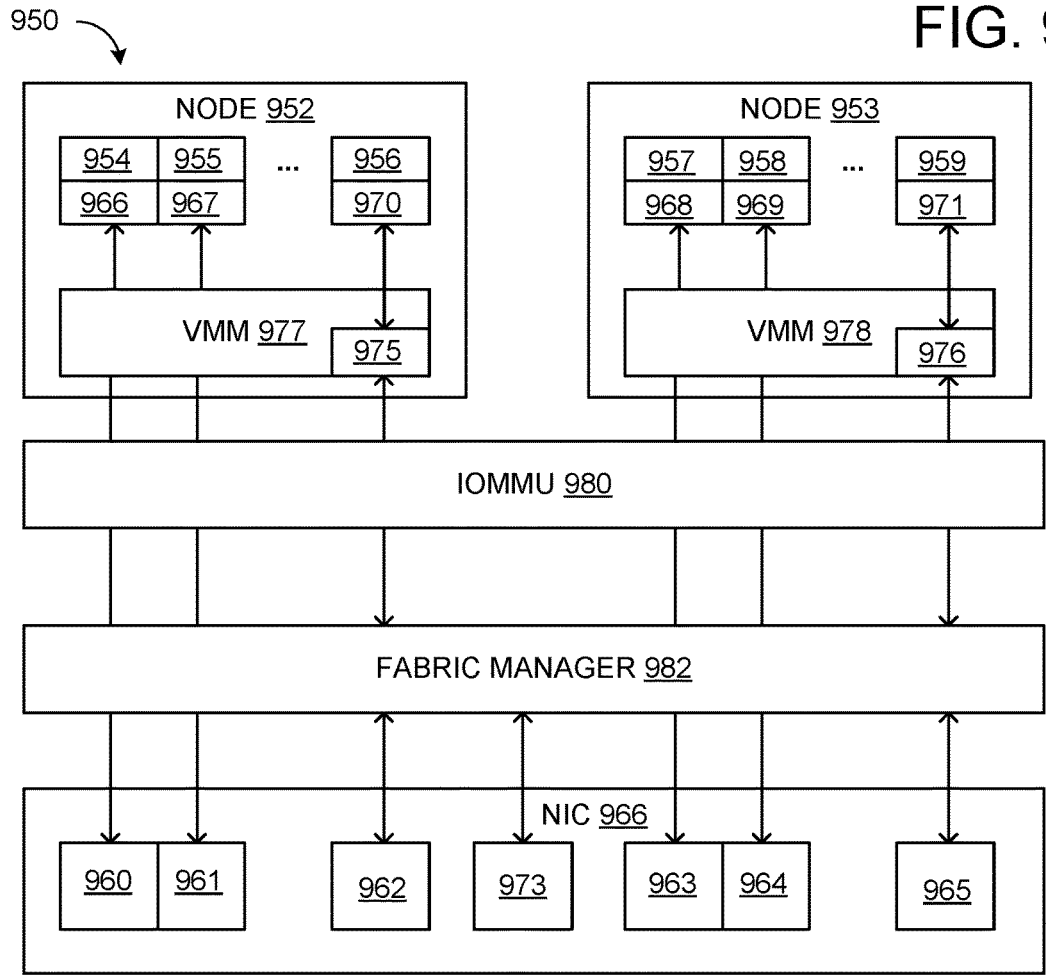
FIG. 9B schematically shows a system for pooling IO devices across multiple compute nodes according to the present disclosure.

FIG. 9B schematically shows a system 950 for pooling IO devices across multiple compute nodes according to the present disclosure. In system 950, each compute node (e.g, nodes 952 and 953, though more may be included) operates a plurality of virtual machines (e.g., VMs 954, 955, 956,

957, 958, 959). Most of the virtual machines operate in conjunction with a virtual function (e.g., VF 960, 961, 962, 963, 964, 965) hosted by a single NIC 966, via a virtual function driver (e.g., VF drivers 966, 967, 968, 969, 970). Each compute node includes one virtual machine (e.g., VMs 956, 959) that operates in conjunction with a virtual NIC (e.g., Virtual NICs 971 and 972) using a physical function (e.g., physical functions 973) hosted by NIC 966 via a PF driver (e.g., PF drivers 975, 976) of a virtual machine manager (e.g., VMMs 977, 978) for the respective node.

In contrast to system 900, instead of providing NICs for each compute node, there is a single NIC 966 that is being pooled across nodes 952 and 953 via IOMMU 980 and fabric manager 982. SR-IOV principles may be leveraged for pooling, while a virtual hierarchy scheme may be defined by the serial bus interface specifications.

To achieve this, fabric manager 982 may be configured to own the physical function of each device, while at the same time binding virtual functions to the individual nodes. All downstream configuration and IO requests may be trapped at fabric manager 982, until a response can be emulated. Further, fabric manager 982 may program the host IO bridge for appending node IDs (as described with regard to FIGS. 5 and 6) for upstream untranslated requests, as well as for address translation services responses.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
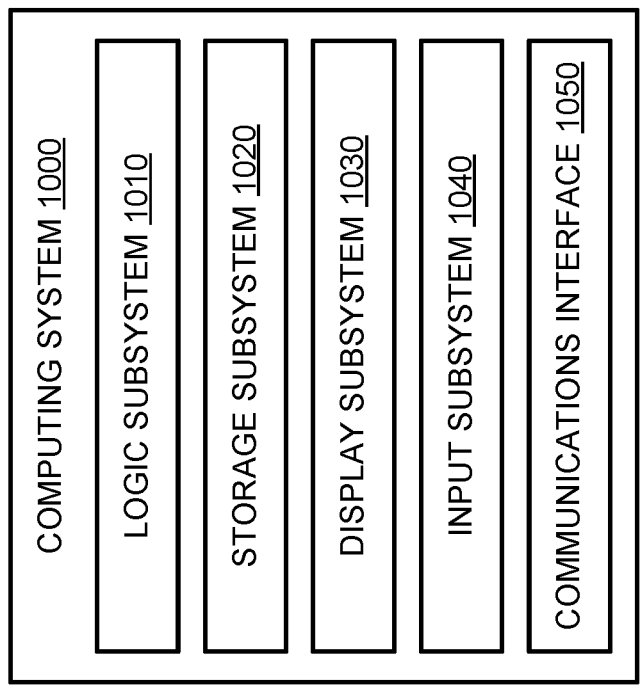
FIG. 10 schematically shows an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1010 and a storage machine 1020. Computing system 1000 may optionally include a display subsystem 1030, input subsystem 1040, communication subsystem 1050, and/or other components not shown in FIG. 10.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, Blu-Ray Disc), semiconductor memory (e.g., RAM, EPROM, EEPROM), and/or magnetic memory (e.g., hard-disk drive, floppy-disk drive, tape drive, MRAM), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1010 executing instructions held by storage machine 1020. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1020 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices.

When included, input subsystem 1040 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1050 may be configured to communicatively couple computing system 1000 with one or more other computing devices. Communication subsystem 1050 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In one example, a computing device comprises two or more compute nodes, each compute node including two or more processor cores, each compute node comprising an independently coherent domain that is not coherent with other compute nodes; a central IO die communicatively coupled to each of the two or more compute nodes; and a plurality of natively-attached volatile memory units attached to the central IO die via one or more memory controllers, wherein the central IO die includes one or more home agents for each compute node, the home agents configured to map memory access requests received from the compute nodes to one or more addresses within the natively-attached volatile memory units. In such an example, or any other example, the computing device additionally or alternatively comprises one or more disaggregated memory units attached to the central IO die via a serial bus interconnect, wherein the home agents are further configured to map memory access requests received from a compute node to one or more addresses within the disaggregated memory units. In any of the preceding examples, or any other example, each compute node additionally or alternatively has access to each of the natively-attached volatile memory units and each of the disaggregated memory units. In any of the preceding examples, or any other example, portions of one or more of the natively-attached volatile memory units are additionally or alternatively assigned to a first compute node based on one or more of received requests from the first compute node for more memory and an availability of one or more of natively-attached volatile memory units and disaggregated memory units. In any of the preceding examples, or any other example, portions of one or more of the natively-attached volatile memory units are additionally or alternatively assigned to a first compute node based on node-specific requirements. In any of the preceding examples, or any other example, portions of one or more of the natively-attached volatile memory units are additionally or alternatively unassigned from the first compute node and re-assigned to a second compute node based on node-specific requirements within the computing device. In any of the preceding examples, or any other example, portions of one or more of the natively-attached volatile memory units are additionally or alternatively unassigned from the first compute node and re-assigned to a second compute node based on a received request from the second compute node for more memory. In any of the preceding examples, or any other example, portions of one or more of the natively-attached volatile memory units are additionally or alternatively unassigned from the first compute node and re-assigned to a second compute node based on an availability of one or more of natively-attached volatile memory units and disaggregated memory units. In any of the preceding examples, or any other example, one or more disaggregated caches are additionally or alternatively coupled to each memory controller. In any of the preceding examples, or any other example, each memory controller additionally or alternatively comprises one or more high bandwidth memory channels configured to be shared among the two or more compute nodes.

In another example, a computing device including a system-on-a-chip comprises two or more compute nodes, each compute node including two or more processor cores, each node comprising an independently coherent domain that is not coherent with other compute nodes; and a central IO die communicatively coupled to each of the two or more compute nodes via dedicated compute die ports, the central IO die including: one or more native memory interfaces attached to one or more memory controllers selectively coupling each compute node to one or more natively-attached volatile memory units; one or more interconnects to selectively couple each compute node to one or more disaggregated memory units; one or more connectivity links to selectively couple the two or more compute nodes to one or more external devices; and a fabric manager configured to mediate pooling of all IO devices among the two or more compute nodes. In such an example, or any other example, the central IO die additionally or alternatively includes all package IO interfaces for the two or more compute nodes. In any of the preceding examples, or any other example, the central IO die additionally or alternatively includes a multi-node aware serial bus interconnect switch configured to pool IO devices connected to the central IO die across the two or more compute nodes. In any of the preceding examples, or any other example, the pooling of IO devices is additionally or alternatively managed using a pooled single root I/O virtualization (SR-IOV) interface. In any of the preceding examples, or any other example, the pooled SR-IOV interface additionally or alternatively includes a single network interface controller (NIC) coupled to each of the compute nodes via the fabric manager and an input-output memory management unit (IOMMU). In any of the preceding examples, or any other example, the fabric manager is additionally or alternatively configured to own a physical function of the NIC and to bind virtual functions hosted by the NIC to individual compute nodes.

In yet another example, a method for memory address mapping comprises at a central IO die communicatively connected to two or more independently coherent compute nodes, receiving a memory access request from a first compute node including a host physical address for the first compute node; mapping the host physical address for the received request to a system address map including ranges of host physical addresses for each of the two or more independently coherent compute nodes; outputting a package physical address based on the mapped host physical address; mapping the package physical address to a physical element of a memory unit selectively coupled to the first compute node via the central IO die; and providing the first compute node access to the physical element of the memory unit. In such an example, or any other example, the system address map additionally or alternatively includes contiguous address slabs of equal length for each of the two or more nodes. In any of the preceding examples, or any other example, the package physical address additionally or alternatively includes a node ID appended to the host physical address. In any of the preceding examples, or any other example, a range of the host physical addresses is additionally or alternatively interleaved among available home agents and memory channels included in the central IO die.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all combinations and sub-combinations of the various processes, systems and configurations, and other features, functions, acts, and/or properties disclosed herein, as well as any and all equivalents thereof.

The invention claimed is:

1. A computing device including a system-on-a-chip, comprising:
a network interface controller (NIC) that hosts a plurality of virtual functions and physical functions;
two or more compute nodes coupled to the NIC, each compute node configured to operate:
a plurality of Virtual Machines (VMs), each VM configured to operate in conjunction with a virtual function via a virtual function driver; and
a dedicated VM that operates in conjunction with a virtual NIC using a physical function hosted by the NIC via a physical function driver hosted by the compute node; and
a fabric manager configured to:
own a physical function of the NIC;
bind virtual functions hosted by the NIC to individual compute nodes; and
pool I/O devices across the two or more compute nodes.

2. The computing device of claim 1, wherein the fabric manager and NIC are included in a central IO die communicatively coupled to each of the two or more compute nodes such that each compute node can access each IO device via the NIC.

3. The computing device of claim 1, wherein each node comprises a virtual machine manager configured to host the physical function driver for the node.

4. The computing device of claim 1, further comprising an IO memory management unit configured to facilitate pairing between each node and the NIC.

5. The computing device of claim 1, wherein the fabric manager is further configured to virtualization resources across the two or more compute nodes.

6. The computing device of claim 1, wherein the fabric manager is further configured to trap all downstream configuration and/or IO requests until a response can be emulated.

7. The computing device of claim 1, wherein the fabric manager is configure to pool IO devices across the two or more compute nodes at least by leveraging single root I/O virtualization principles via the physical function.

8. The computing device of claim 1, wherein the IO devices include memory units.

9. The computing device of claim 1, wherein the fabric manager is further configured to program a host IO bridge for appending compute node identifications for upstream untranslated requests and/or for address translation services responses.

10. A computing device, comprising:
two or more compute nodes, each compute node comprising an independently coherent domain that is not coherent with other compute nodes; and
a central IO die communicatively coupled to each of the two or more compute nodes, the central IO die comprising:
a compute die port coupled to each compute node;
a memory port communicatively coupled to disaggregated memory at an external device via an IO port;
a memory controller communicatively coupled to natively attached memory; and
a plurality of distributed home agents communicatively coupled to each compute die port, communicatively coupled via a target address controller (TAD) to at least one memory port and at least one memory controller, each home agent configured to:
receive a request for either disaggregated memory or natively attached memory from a requesting compute node via a respective compute die port;
pass the received request to the TAD;
at the TAD, responsive to the received request indicating disaggregated memory, map the received request to a target memory port; and
at the TAD, responsive to the received request indicating natively attached memory, map the received request to a target memory controller.

11. The computing device of claim 10, wherein the compute die port decodes an address within the received request and maps the decoded address to a respective home agent.

12. The computing device of claim 10, wherein the target memory port is coupled to an external device comprising the disaggregated memory.

13. The computing device of claim 10, wherein the home agent further comprises a cache currency mechanism comprising a snoop filter, the cache currency mechanism coupled to the TAD via content addressable memory.

14. The computing device of claim 13, wherein the home agent is further configured to:
receive a request for memory access;
using the snoop filter, determine whether an updated copy of the request for memory access exists in the content addressable memory; and
present the updated copy of the request for retrieval.

15. The computing device of claim 13, wherein the IO port further includes a serial bus interconnect (SBI) currency port configured to allow parallel lookups to external cache and to disaggregated memory.

16. The computing device of claim 15, wherein the home agent is coupled to one or more additional external devices via the IO port.

17. The computing device of claim 16, wherein the central IO die is configured to:
receive a request for an IO virtual address from the external device via an SBI root port;
at the SBI root port, translate the IO virtual address into a known physical address;

decode the known physical address such that any request for a given physical address targets the same home agent;

send the decoded known physical address to the respective home agent; and at the home agent, translate the decoded known physical address for the external device.

* * * * *